Aug. 11, 1936.  R. STRINDBERG  2,050,508
GAS FILTER
Filed Dec. 11, 1934  3 Sheets-Sheet 1
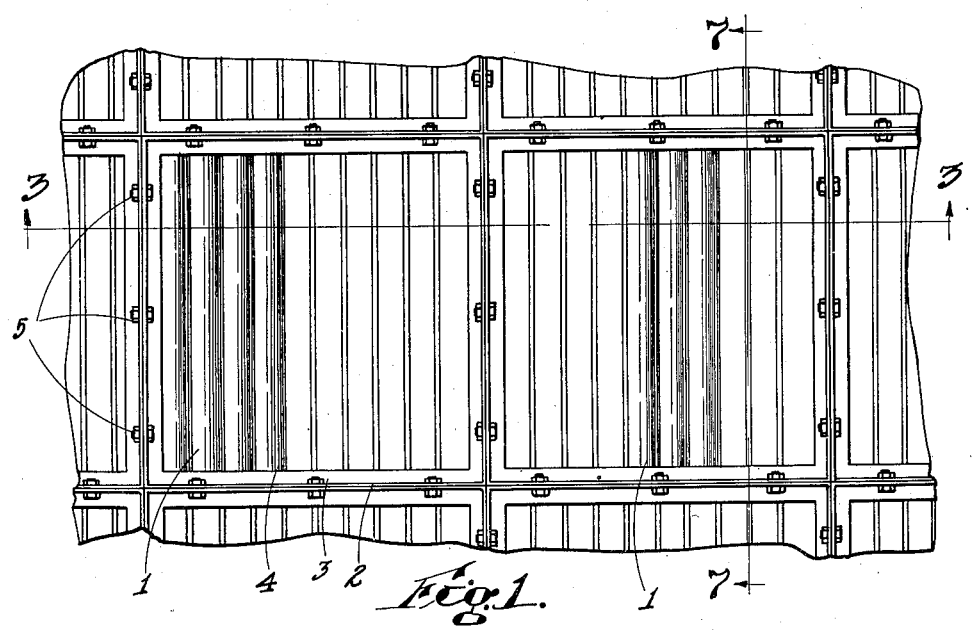
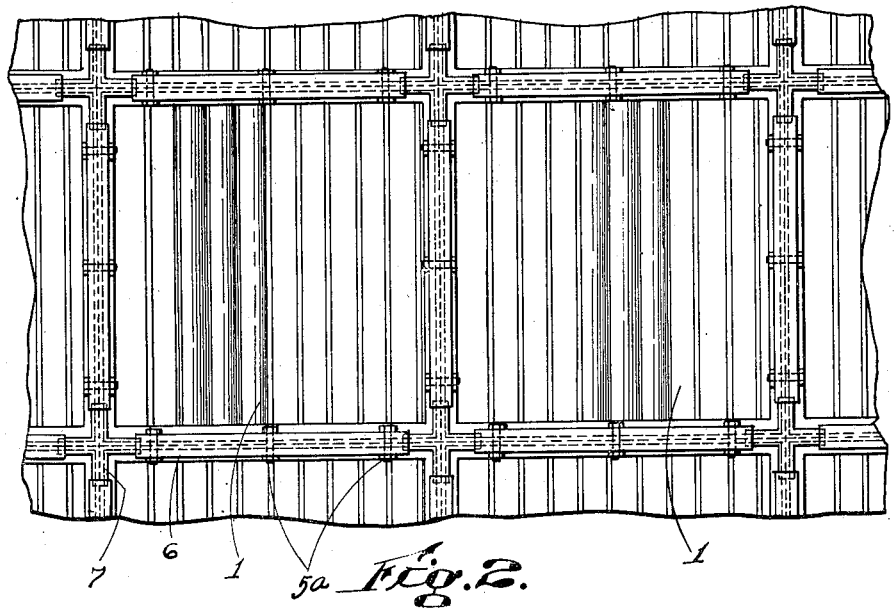

Aug. 11, 1936.                R. STRINDBERG                2,050,508
                                GAS FILTER
                          Filed Dec. 11, 1934            3 Sheets-Sheet 2

Inventor:
Richard Strindberg
By Geo. H. Kennedy Jr.
Attorney

Aug. 11, 1936.   R. STRINDBERG   2,050,508
GAS FILTER
Filed Dec. 11, 1934   3 Sheets-Sheet 3
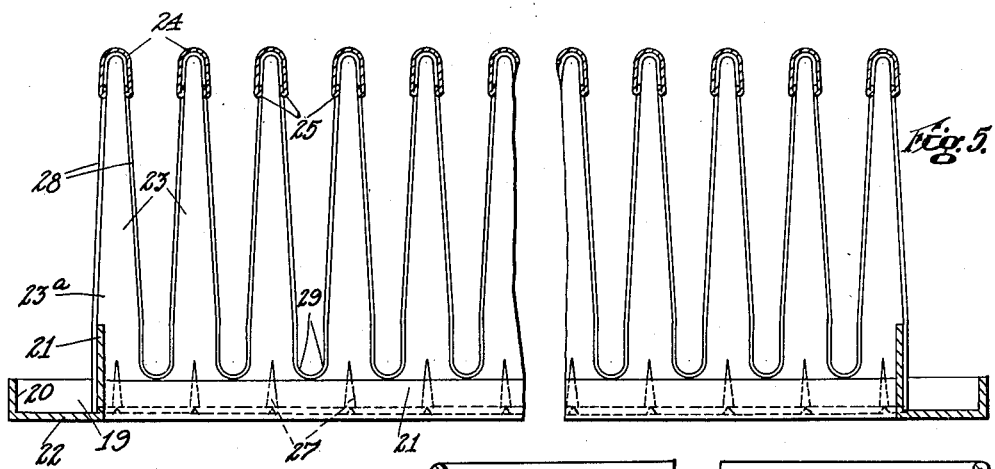
Fig. 5.
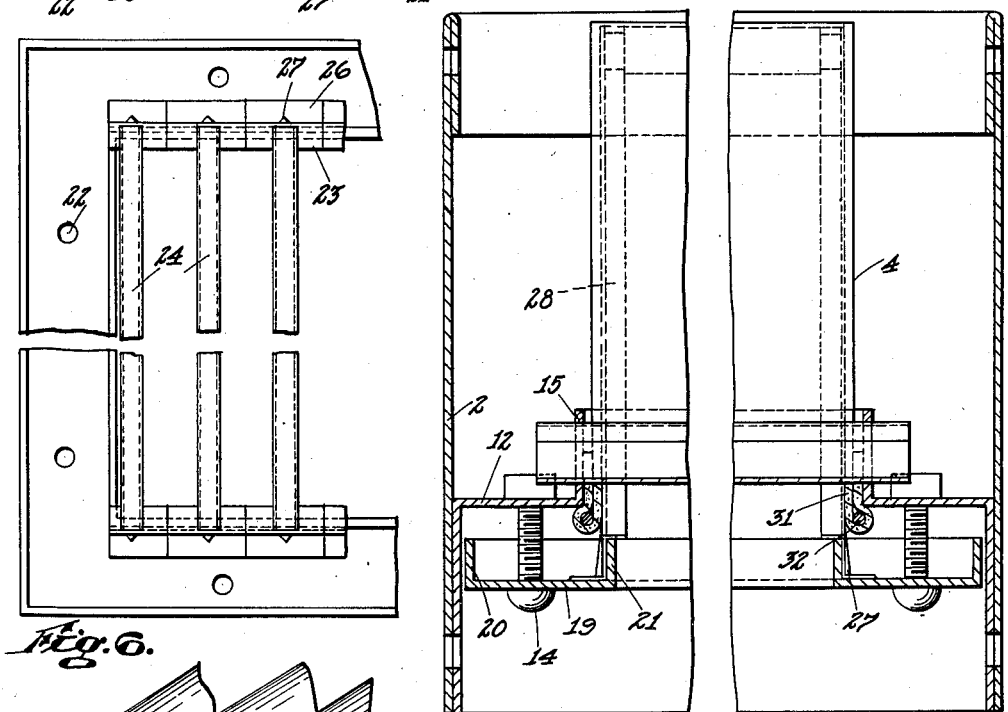
Fig. 6.
Fig. 7.
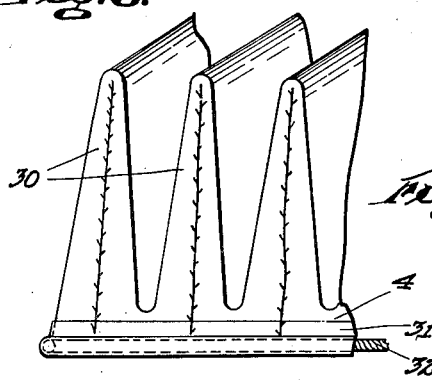
Fig. 8.
Inventor:
Richard Strindberg
By Geo. H. Kennedy
Attorney Patented Aug. 11, 1936

2,050,508

UNITED STATES PATENT OFFICE 2,050,508

GAS FILTER

Richard Strindberg, Worcester, Mass., assignor to Development Associates, Inc., Worcester, Mass., a corporation of Massachusetts Application December 11, 1934, Serial No. 757,000

13 Claims. (Cl. 183—71)

The invention of the present application, which is a continuation in part of applicant's copending application, Serial No. 646,583, filed December 10, 1932, for "Air filters", relates to that type of air or gas filter which employs a suitable more or less porous fabric for the interception of the dust and other foreign particles carried by the air or gas which is forced through said fabric,—the latter being provided in "glove" or zigzag form, to increase the effective filtering area and to diminish correspondingly the resistance to the passage of the air or gas through said material.

In prior devices of this character, each filter unit is made up of a multiplicity of separate members which cooperate to hold the filter material or filter glove in position and to form a seal around the outer edge thereof. The several members however do not maintain the filter material taut and thus said filter will not operate at its highest efficiency. One of the principal objects of the present invention is to reduce the necessary parts of the filter unit to a minimum. At the same time, the arrangement of the parts of the unit permits the filter material to be held in a taut condition so that the latter, even if it stretches as a result of humidity of the air, can always be adjusted to a taut condition.

Cleaning of the filter material in this type of filter is preferably accomplished by a vacuum cleaner having a nozzle to fit a predetermined portion of the filter glove, said nozzle removing dirt and foreign matter from the filter material by forcing air therethrough in the direction opposite to the normal movement of air during filtering. The nozzle is operable on either side of the filter material, using compressed air when positioned on the discharge side or operating under a vacuum when used on the intake side, and for easy and complete cleaning of the filter glove the material thereof must be held taut and the surface thereof must be free, on the side on which the nozzle operates, from the supporting members which might interfere with the movement of the cleaning nozzle over the surface of the glove. It is accordingly a further object of the present invention to eliminate to as great an extent as possible any supporting members which would interfere with the cleaning of the filter without, however, detracting from the rigidity of the frame which supports the filter material. The supporting members, which provide a relative rigid support for the filter material, are so constructed as to cover the smallest area possible on both sides of the filter, thereby rendering operative substantially the entire area of the filter glove.

The most efficient arrangement of filter material is in the form of tapered pockets and a further object of the present invention is to support the filter material in the desired configuration and at the same time to hold the material in stretched condition. To this end the filter unit comprises a plurality of tapered supports over which the filter material or glove is positioned and retained in stretched condition.

In the mounting of a plurality of filter units in a single filter installation, a framework for the filter units is built up and the individual units are separately positioned in said framework until the desired number of units are in position for filtering the air. This additional framework necessarily increases the cost of a filter installation as well as the weight thereof. A further object of the invention is accordingly to avoid this objection by the provision of a filter unit which is capable of forming one of a plurality of units in a single filter installation without the necessity for any additional connecting elements between the several units. In accordance with this feature of the invention the several filter units are so arranged as to be positioned edge to edge and secured directly together, each unit including a removable frame by which the filter glove may be replaced without removal of the entire unit. Furthermore, the several units are so positioned in the installation that the filter gloves of the individual units can be cleaned in position without the removal of any part of the unit from its normal position.

Other and further objects and advantages of the invention will appear from the following detailed description taken in connection with the accompanying drawings, in which,—

Fig. 1 is a fragmentary elevation of a filter installation showing several filter units.

Fig. 2 is similar to Fig. 1, showing a modification.

Fig. 5 is a transverse sectional view of the removable frame and distender.

Fig. 6 is a fragmentary plan view of the structure of Fig. 5.

Fig. 7 is a sectional view along the line 7—7 of Fig. 1.

Fig. 8 is a perspective view of a corner of the removable frame and distender with the filter glove positioned thereon.

Like reference characters refer to like parts in the different figures.

Figure 3:
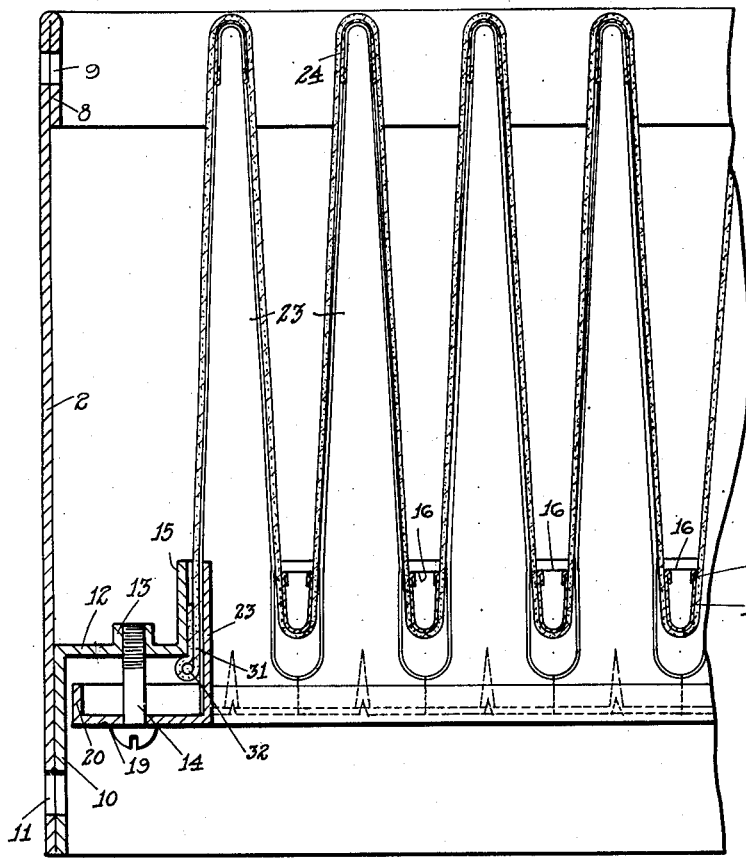
Fig. 3 is a transverse sectional view through a filter unit substantially along the line 3—3 of Fig. 1.

Referring first to Fig. 1, a plurality of filter units 1, each comprising a box or casing 2, a movable or adjustable frame 3 and a filter member or glove 4, as hereinafter described, are arranged to be mounted in banks consisting of several filter units in accordance with the requirements of each individual installation, these banks of units being located in the air passage through which the air is forced. The casings 2, which are rectangular as shown, are placed edge to edge and are secured together by bolts 5 passing through the side walls of adjacent casings. The bolts 5 are arranged in parallel rows adjacent opposite edges of the filter casings, only one row of said bolts being shown. By this arrangement any number of filter units may be combined in a single installation for building up a filter bank of the desired capacity. The several casings making up the bank are permanently secured together since, as will be pointed out hereinafter, the filter glove and movable distending frame can be removed from the casing for replacing the glove.

Since the adjacent filter units are positively connected together there can be no appreciable leakage of air through the filter bank. However, where a small leakage of air between adjacent units might be objectionable, the possibilities for such leakage to occur may be eliminated, as shown in Fig. 2, by covering the adjoining edges of the filter boxes with U-shaped strips 6 extending between adjacent corners of the several filter units and flanged members 7 arranged in the form of a cross which are positioned at the corners of the several filter units, as indicated. When these members 6 and 7 are used the bolts 5a, corresponding to the bolts 5, pass through the members 6 as well as the side walls of the filter units.

Figure 4:
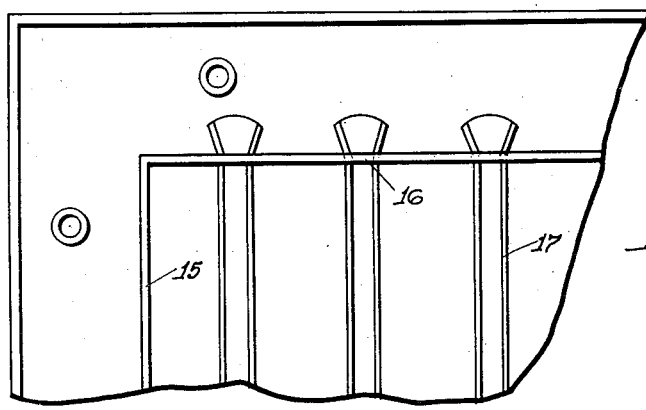
Fig. 4 is a fragmentary plan view of the filter casing or box.

Referring to Figs. 3 and 4, the filter casing 2 is in the form of a rectangular box open at the top and bottom and being formed from sheet metal. The upper edge of sheet material forming the box is folded over, as at 8, to provide a double thickness wall portion adjacent the upper edge of the box, said double thickness portion having openings 9 therethrough for the reception of the bolts 5, above referred to, which hold adjacent filter units together. The lower edge of the box forming the casing is reinforced by a member 10, Z-shaped in cross-section, positioned on the inside of said box. One leg of the member is suitably secured, as by spot-welding, to the lower edge of the box to form a double thickness portion for said box in which are provided openings 11 for the other row of bolts 5, above referred to. The central portion 12 of the member 10 extends at right angles to the box walls, and is spaced, as best shown in Fig. 3, from the lower edge of said box. Said portion 12 has spaced threaded openings 13 therein for the reception of bolts or screws 14 by which the movable frame 3 is held in position. The other leg 15 of the member 10, which is spaced from the wall of the casing, extends in parallel relation to the casing walls, and completely around said casing, internally thereof, to form, together with a part of the movable frame, an air seal at the edge of the filter glove.

As best shown in Fig. 4, the flange 15 at opposite ends of the casing 2 is provided with a plurality of spaced openings 16 for the reception of spaced U-shaped bars 17 extending across the filter casing. The outer ends of said bars 17 are bent outwardly to retain said bars in position and the opposite edges 18 of said bars are bent over, as shown in Fig. 3, to eliminate sharp edges thereon. Said bars form a grid which is a permanent part of the filter casing and which cooperates with the movable frame and distender, as will hereinafter more fully appear, in supporting the filter glove in stretched condition.

Referring now to Figs. 5 and 6, the movable frame member 3 comprises a rectangular shaped frame 19 having a flange 20 on the outer edge thereof and a parallel flange 21 on the inner edge, both flanges extending entirely around said frame. The frame 19 is slightly smaller than the casing 2 so that said frame can be received within said casing, and said frame has a plurality of openings 22 for the reception of the bolts 14, by which said frame is held in position. The inner flange 21 is arranged to extend upwardly in parallel relation to the flange 15 and spaced slightly therefrom, as indicated in Figs. 3 and 7.

The movable frame has an integral distender on which the glove is positioned, said distender comprising, as best shown in Figs. 5 and 6, a plurality of parallelly arranged tapering fingers 23 extending upwardly from the frame member 3 at opposite edges thereof. Supporting members 24, U-shaped in cross-section, extend transversely of the frame member and provide connections between the outer ends of opposite fingers. The members 24 are suitably secured, as by welding, to the fingers, and the edges of said members are bent inwardly as indicated at 25 to avoid any sharp edges thereon. The members 24 form a gridwork and are spaced apart distances equal to the spacing of the bars 17, said members and the bars cooperating in holding the filter glove in stretched condition.

Each of the fingers 23 is preferably separately formed from sheet material and has a projecting flange 26, Fig. 6, by which the finger is secured, as by welding, to the frame 3. Each finger is reenforced by providing a central offset 27 extending upwardly from the flange 26 to a point above the upper edge of the flange 21 against which each of the fingers is positioned. Above the upper edge of the flange 21 the opposite edges of the fingers 23 are bent to define flanges 28 extending inwardly to avoid any sharp edges which might cut the filter material positioned thereon. Adjacent to the lower edge of the fingers the flange 28 is arcuate outwardly, as at 29, with the end of said flange in alinement with the end of the corresponding flange on the adjacent finger. When the fingers are in position on the frame 3 a tapering notch is thus defined between adjacent fingers, the flanges 28 forming a continuous margin for said notch. The flange 28 on the outermost finger 23a at each end of the row of fingers extends downwardly to the flange 26 and, as shown, extends around the flange 21 at the corner of the frame 3. Said flange 21 at the ends adjacent to the fingers is shorter than the flange on the other sides of the frame, as will be apparent.

The glove 4 which is formed of suitable filtering material such as felt, is arranged in the form of a plurality of parallel tapered pockets 30, each of said pockets being substantially equal in length to the supporting members 24 and slightly less deep than the length of the fingers 23. Obviously the number of pockets corresponds to the number of supporting bars 24 and the taper of the fingers 23 corresponds to the desired taper for the pockets. The opposite ends of each pocket are closed and a depending skirt 31 extending completely around the several pockets has a bead 32 sewed in the hem thereof, said bead being preferably of a suitable flexible but not compressible material, such as cord.

When the glove is positioned on the movable frame and integral distender, the latter comprising the fingers 23 and the supporting members 24 integral therewith, the depending skirt on the glove extends around the flange 21 on the outside thereof, said skirt being preferably long enough to extend, as shown in Fig. 7, at least to the bottom of the notches between adjacent tapered fingers. Said movable frame with the glove in position thereon is then inserted within the casing 2 with the several supporting members 24 extending in parallel relation to the grid member or bars 17 of the casing. As the frame 3 is brought into parallel relation to the flange 12 of the casing, as shown in Fig. 3, the inner edge of said flange engages with the hem of the skirt directly above the bead 32 and the several bars 17 engage with the filter material at the base of the loops between adjacent pockets. Tightening of the screws 14 when the members are thus assembled provides for a stretching of the filter material to the desired extent and at the same time the skirt of the filter material provides a seal around the edge of said material so that any air passing through the casing 2 must pass through the filter material.

It will be noted that the U-shaped bars 17 and U-shaped supporting members 24 have their opposite sides tapered, as best shown in Fig. 3, to correspond to the taper of the pockets of the glove and provide a support for said glove which will retain the latter in the desired tapered form which has been found to be most efficient for the filtering of air passing therethrough. Since the bars 17 and members 24 are U-shaped in cross-section, they provide a rigid support for the filter material without, however, covering such an area of said material as to interfere substantially with the filtering of air passing therethrough. At the same time, the several pockets of the filter glove are all retained in precisely the same configuration by said bar and supporting members as well as by the tapered fingers 23 so that a cleaning nozzle shaped to fit one of the pockets will fit each of the pockets equally as well. There is nothing on either the discharge or the intake side of the casing to interfere with the movement of the cleaning nozzle over the filtering material so that a complete and thorough cleaning can be effected at any time, and the straight bars 24 or 17 provide a smooth unbroken surface to avoid wear on the filter material as the nozzle is slid along the pocket on the side of the material opposite to said bars.

The casing is preferably positioned so that the screws 14 and frame 3 are located on the clean air side of the filter. If for any reason the filter glove requires replacement, the movable frame 3 can easily be taken from the casing by removal of the screws 14. The filter glove is removed from the casing with the frame 3 and a new glove is easily substituted for the damaged glove on said removable frame. The frame 3 is then restored to its position in the casing and the new glove thereon is stretched to the desired position by adjustment of the screws 14. It will be apparent, from the foregoing, that the filter glove in any one of a plurality of filter units built up as shown in Figs. 1 and 2 may be replaced without removal of the filter casing from the installation.

From the foregoing it will be apparent that the filter unit of the present invention provides for the mounting of a plurality of filter units in a single installation without the provision of any auxiliary frames in which the several units are positioned and also provides for the removal of the filter glove from any one of the units without the necessity for the removal of a complete unit from the installation. The filter glove in each individual unit of the installation can be readily cleaned from either side thereof without the necessity for the removal of any part thereof from the installation. Moreover, each individual filter unit consists of a minimum number of parts, consisting of the outer casing with its integral grid, the movable frame with its integral glove distender, and the filter member or glove. The construction of the movable frame provides for maintaining the filter material in stretched condition at all times and also provides for holding the filter material in its most efficient filtering configuration, at the same time providing for rapid cleaning of the material by having the intake side of the glove substantially free from members which would interfere with the movement of the cleaning nozzle over the pockets of the material. The provision of inturned edges on the members forming the supports for the filter glove eliminates the wear on said glove resulting from movement thereof on the supports or from movement of the cleaning nozzle over the glove.

I claim:

1. A filter unit comprising a filter casing, a distender frame positioned in said casing and a multipocket glove of filter material positioned on one of said members, said casing and distender frame having integral cooperating means for retaining said glove in filtering position, said casing and distender frame having cooperating means integral therewith and engageable with the edge of the filter glove for forming an airtight seal around the edge of the glove.

2. In a filter unit, the combination with a filter casing, a movable distender frame within said casing and a multipocket filtering glove supported by said distender frame and casing in operative filtering position, of means for adjusting said casing and distender frame relative to each other for maintaining said glove under tension, and cooperating members integral with said casing and distender frame and engageable with said glove for supporting said glove in proper position.

3. A filter unit comprising a filter casing, a distender within said casing and a glove of filter material positioned on said distender, said glove having at least one pocket formed therein, said distender having a plurality of supporting fingers corresponding in shape to the cross sectional shape of the pocket and engaging in said pocket for holding the latter in filtering position, and a bar connecting the ends of the several fingers in said pocket, said bar being U-shaped in cross section and extending over the ends of said fingers.

4. In a filter unit, a filter casing, a movable distender frame within said casing, a filter glove having a plurality of pockets therein, a plurality of distender members on said frame for engagement in the pockets of the glove, means integral with said casing and cooperating with said distender members for holding a glove in filtering position when the distender frame is in position within said casing, means on said casing and frame and engageable with the edge of the filter glove for providing an air seal around the entire periphery of said glove, and cooperating means on said frame and casing for adjusting the frame as a unit relative to the casing to maintain the filter glove under tension.

5. In a filter unit, a filter casing, a movable distender frame within said casing, a filter glove having a plurality of pockets therein, a plurality of distender members on said frame for engagement in the pockets of the glove, means integral with said casing and cooperating with said distender members for holding a glove in filtering position when the distender frame is in position within said casing, cooperating means on said frame and casing for adjusting the frame as a unit relative to the casing to maintain the filter glove under tension, and cooperating means on said casing and distender frame engaging with the edges of the filter glove for forming an airtight seal around the edges of the glove.

6. A filter unit comprising a filter casing, a distender frame positioned in said casing and a glove of filter material positioned on one of said members, said casing and distender frame having cooperating grid members U-shaped in cross section for supporting said glove in filtering position, said glove being substantially free from obstruction on both sides thereof to provide for cleaning without removal.

7. A filter unit comprising a filter casing, a distender frame positioned in said casing and a glove of filter material having a plurality of tapered pockets formed therein, said casing and distender frame having cooperating grid members U-shaped in cross section for supporting said glove in filtering position, the opposite sides of said U-shaped grid members converging in accordance with the taper of the pockets in the glove.

8. In a filter unit, a filter casing, a distender frame within said casing, a filter glove, tongues integral with one of said members for supporting said glove, said glove having a plurality of tapering pockets therein, said glove when positioned in the unit being substantially free from obstruction on both sides thereof, to provide for cleaning of said glove without removal thereof from the unit.

9. A filter unit consisting of a filter casing having an integral grid, a multipocket glove of filter material, and a distender frame on which said glove is positioned, said frame being insertable in said casing, and said grid and frame having cooperating members for supporting said glove in filtering position, and means for adjusting said distender frame within the casing for maintaining the filter glove tight, said adjusting means being located entirely outside of the portion of the unit through which the air being filtered is passed.

10. In a filter construction, a casing within which a filter glove is positioned, a plurality of parallel bars of sheet material U-shaped in cross-section and extending between opposite side walls of the casing to aid in supporting the glove in filtering position, a member secured to and within said casing and having openings corresponding in shape to the parallel bars to receive the opposite ends thereof, the extreme ends of said bars beyond the openings being bent outwardly to retain said bars in position.

11. A filter unit consisting of a filter casing having an integral grid, a multipocket glove of filter material, a distender frame on which said glove is positioned, said frame being insertable in the casing, said distender frame having members cooperating with the grid of the casing for supporting the glove in filtering position within said casing, cooperating means on the casing and frame for engagement with the edge of the glove to provide an air seal at the edge of said glove, and means for holding the distender frame in position within the casing and for adjusting the distender frame as a unit within said casing for maintaining the glove under tension.

12. A filter unit consisting of a filter casing having an integral grid, a glove of filter material and a distender on which said glove is positioned, said distender being insertable in said casing and having members cooperating with the integral grid for supporting the glove in filtering position, means on the casing and distender engageable with the edges of the glove on opposite sides thereof for providing an air seal at the edge of said glove, and means for adjusting said distender as a unit within the casing for maintaining the glove under tension.

13. A filter unit consisting of a filter casing having an integral grid, a multipocket glove of filter material, a distender frame on which said glove is positioned, said frame being insertable in the casing, said distender frame having members cooperating with the grid of the casing for supporting the glove in filtering position within said casing, cooperating means on the casing and frame for engagement with the edge of the glove to provide an air seal at the edge of said glove, and means for holding the distender frame in position within the casing and for adjusting the distender frame as a unit within said casing for maintaining the glove under tension, said adjusting means being located entirely outside of the portion of the filter unit through which the air being filtered is passed.

RICHARD STRINDBERG.